TELETYPEWRITER RECEIVER OR THE LIKE

Original Filed March 2, 1954 2 Sheets-Sheet 1

OSCAR B. DUTTON
INVENTOR.

BY Bruce L. Birchard

HIS ATTORNEY

TELETYPEWRITER RECEIVER OR THE LIKE

Original Filed March 2, 1954 2 Sheets-Sheet 2

OSCAR B. DUTTON
INVENTOR.

BY [signature]

HIS ATTORNEY

United States Patent Office 3,038,963

Patented June 12, 1962

3,038,963

TELETYPEWRITER RECEIVER OR THE LIKE

Oscar B. Dutton, Palos Verdes Estates, Calif., assignor to Hoffman Electronics Corporation, a corporation of California Original application Mar. 2, 1954, Ser. No. 413,629, now Patent No. 2,844,650, dated July 22, 1958. Divided and this application June 24, 1958, Ser. No. 744,088

4 Claims. (Cl. 178—88)

This application is a division of co-pending Patent No. 2,844,650 issued July 22, 1958.

This invention is related to a teletypewriter system for transmitting and receiving intelligence-bearing signals and, more particularly, to a receiver for such a system which will assure for that system greater reliability than can be achieved with present teletypewriter systems.

In the past, many attempts have been made to design a satisfactory teletypewriter system which would exhibit optimum reliability under, and adaptability to, all operating conditions. Invariably these attempts have encountered certain problems which render teletypewriter systems heretofore designed deficient in some respect. For example, teletypewriter systems presently in use have but one message transmission speed, and hence the advantages of increased reliability by the reduction of message speed, if transmission systems warrant such reduction, are lost. Also, decoding in the receiving portion of these systems invariably is dependent upon the relative length of the character units, and thus error is introduced by the occurrence of pulse stretching in the presence of multipath transmission. And, in addition, the design of present teletypewriter systems requires synchronization of the receiver with the transmitter, thus affording a further source of probable error.

Therefore, it is an object of this invention to provide an improved teletypewriter receiver.

It is a further object of this invention to provide an improved teletypewriter receiver which will be completely non-synchronous with the transmitter and also will exhibit optimum reliability under all operating conditions.

According to this invention, intelligence characters which have been encoded in the teletypewriter transmitter by using a combination of on-off keying and variation in the scanning rate of a definite number of frequency diversity channels, are decoded in the receiver by detecting the diversity channel signals separately and sequentially feeding these signals through a common damped tuned-circuit to a series of counter-chain circuits. Presentation of the decoded signals may be accomplished by means of a drum, tape, and print bar, the drum having a simple binary coding system which relates angular position of the drum with the particular condition of the receiver counter-chain circuits, and, consequently, with a particular character representation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figures 1, 2:
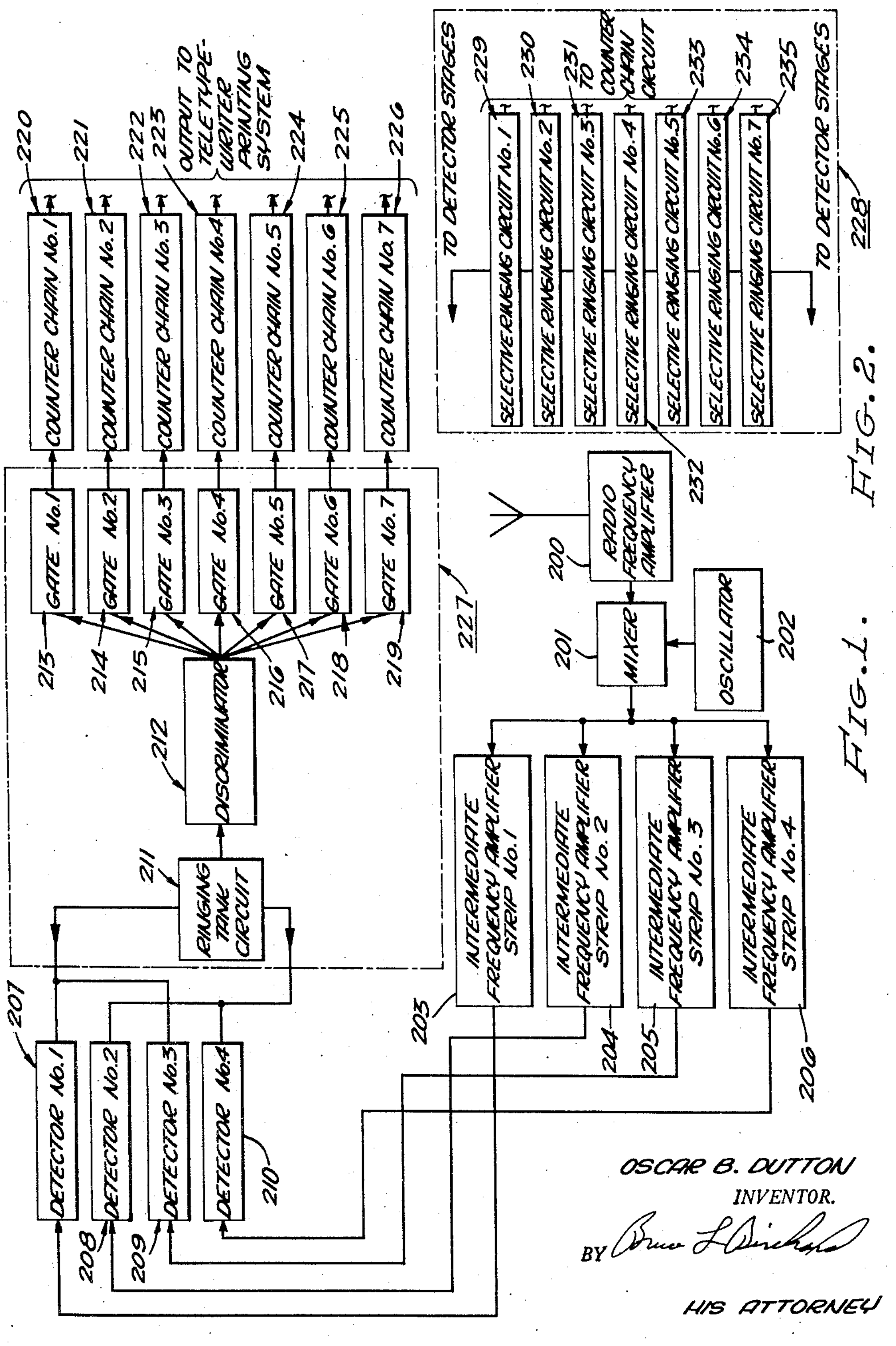
FIGURE 1 is a block diagram of a teletypewriter receiver according to this inventiton.
FIGURE 2 is an alternate form of a portion of the circuit of FIGURE 2.

In FIGURE 1 intelligence-bearing signals, such as those produced by the transmitter of the parent patent 2,844,650 mentioned above are intercepted by the antenna feeding R-F amplifier 200 which is connected, in conventional manner, to mixer 201, to which oscillator 202 is also connected. The output of mixer 201 is fed through intermediate frequency amplifier strips 203, 204, 205 and 206, and through detector stages 207, 208, 209 and 210, respectively, to ringing tank circuit 211. Intermediate frequency amplifier strips 203, 204, 205 and 206 are sharply tuned to select and amplify separately the four frequency diversity signals. Respective detectors 207, 208, 209 and 210 of the frequency diversity receiver are alternately connected to either end of ringing tank circuit 211, as shown in FIGURE 1. Ringing tank circuit 211 is highly damped, being so chosen that it will faithfully respond to the entire range of transmission scanning frequencies. Its nominal resonant frequency is equal to twice the output scanning frequency of the transmitter's four-step ring counter, and, correspondingly, one-half the mean repetition frequency of generator 20, shown in the above patent.

Ringing tank circuit 211 is coupled to discriminator 212, the output of which consists of D.C. voltage pulses, their magnitude and polarity being dependent upon the particular repetition rate of generator 20 at the transmitter. These voltages are fed to gate circuits 213, 214, 215, 216, 217, 218 and 219 which respond only to certain pre-set potentials of a definite polarity. Gate circuits 213, 214, 215, 216, 217, 218 and 219 are in turn connected respectively to conventional counter-chain circuits 220, 221, 222, 223, 224, 225 and 226, which are capable of counting and storing up to seven mark signals. The counting circuits are so chosen as to respond only to the presence of signals, and not to depend upon the length of mark for their operation. This means that all but a small portion of the mark signal could be missed without failure of the counting system to record the proper count. The output signals from the counter chains are subsequently directed to the Presentation System.

The circuit of FIGURE 1 operates as follows. Incoming intelligence-bearing signals are intercepted by antenna 200 and fed to mixer 201, to be intermodulated with the output signal of oscillator 202. The output of mixer 201 is fed through intermediate frequency amplifier strips 203, 204, 205 and 206, and through detectors 207, 208 209, and 210, respectively, to a common ringing tank circuit 211, which is responsive to the entire range of scanning frequencies of the teletypewriter transmitter. The output of tank circuit 211 is coupled to discriminator stage 212. Discriminator stage 212 produces D.C. output control voltages, the magnitude and polarity of which are dependent upon the transmitter scanning frequency being employed. The signal pulses of each scanning frequency are separately fed to their respective gating circuits, and then to their respective chain counters, the output signals of which are fed to the teletypewriter printing system for conversion into printed characters.

As an alternate approach, circuit 227 of FIGURE 1, composed of ringing tank circuit 211, discriminator 212, and gate circuits 213, 214, 215, 216, 217, 218, and 219 may be replaced by circuit 228, as shown in FIGURE 2, consisting of a plurality of series-connected conventional selective ringing circuits 229, 230, 231, 232, 233, 234, and 235 responsive to the various pulse repetition rates at the transmitter, these ringing circuits being individually coupled to the proper counter-chain circuit. Also, intermeditae frequency amplifier strips 203, 204, 205, and 206 and detector stages 207, 208, 209, and 210 may be replaced by a single intermediate frequency amplifier strip and detector stage circuit which is responsive to the entire frequency diversity band.

Figure 3:
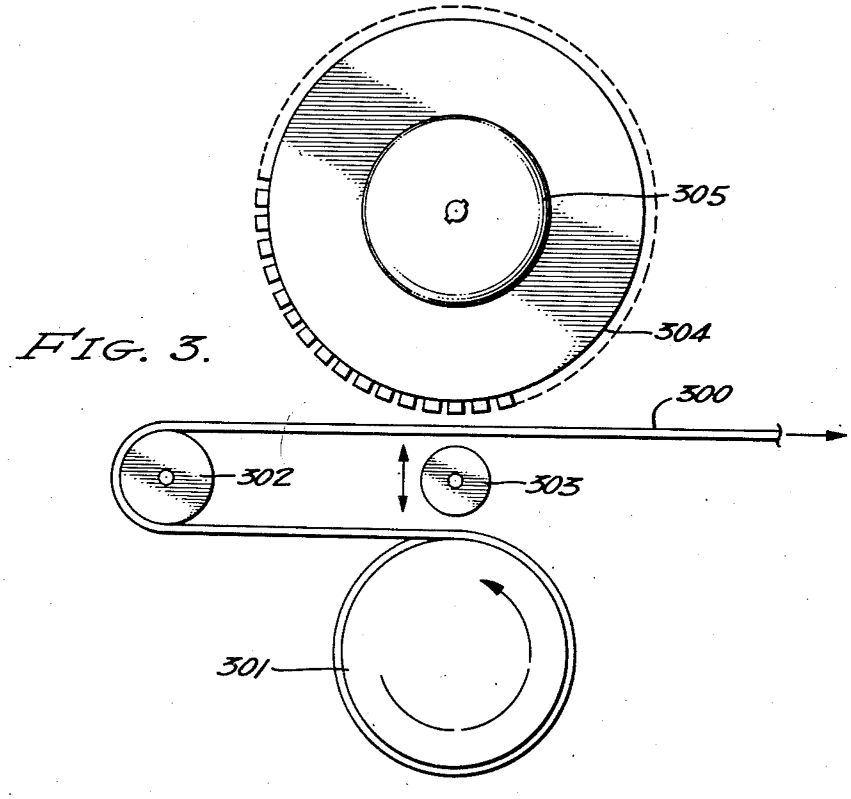
FIGURE 3 is an elevational view of a presentation system which may be employed with this invention.
Figure 4:
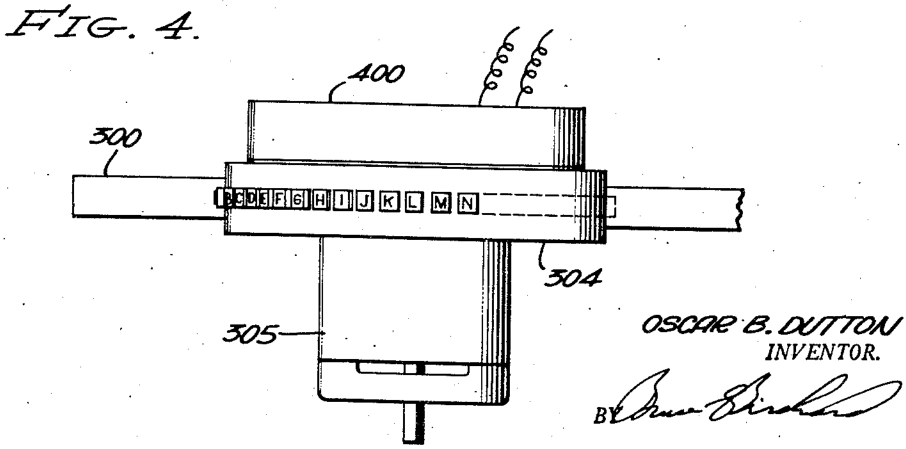
FIGURE 4 is a top plan view of the presentation system of FIGURE 3.

In FIGURES 3 and 4, tape 300 unrolls from tape storage roll 301 and passes over roller 302 until it is in a position directly between print bar 303 and the lower portion of character drum 304, which is driven by motor 305. Binary commutating system 400 uniquely determines the angular position of character drum 304 so that a particular impulse from the teletypewriter receiver will determine which of the several characters on the periphery of drum 304 will be positioned exactly above tape 300, so that when print bar 303 moves upward this letter will be printed on tape 300.

The presentation system described in FIGURES 3 and 4 operates as follows. It has been heretofore explained that each intelligence character transmitted is unique, having a particular number of mark pulses (for example, one to seven) and a particular pulse repetition rate (for example, one of seven rates). Character drum 304 is driven by motor 305 at a constant speed, this speed being such that the drum rotates one complete revolution in a shorter period of time than would be required to transmit one letter when the transmitter is operating at the maximum possible keying speed. Binary commutating system 400 is a device which relates the drum position to the condition of the counter circuits in the decoder portion of the receiver. The counters and the receiver decoder are operated in such a manner that the steady state condition after receiving a character will match one, and only one, condition of the binary segments of the character drum. This information will have been stored in the particular counter until such time as the position of the drum is properly related to condition of the counter and that of the binary commutating system. At that time, an actuating circuit will be completed and the printer will be given a command signal to print. At the instant of printing, the desired character will be directly above tape 300, print bar 303 will rise, print the character, and fall again. The action of print bar 303 will also cause the tape to be advanced one position and the counters to be reset to the zero or start condition in preparation for another character.

The complete system would, of course, incorporate a combination transmitting keyboard and printer. This would permit transmission and reception on the same machine, and also permit the operator to have a record of the message he was transmitting much in the same fashion as is possible with a standard teletypewriter machine.

While particular embodiments of the present invention have been shown and described, it will be obvious to those skilled in the art that changes and modifications may be made without departing from this invention in its broader aspects and, therefore, the aim in the appended claims is to cover all such changes and modifications as wall within the true spirit and scope of this invention.

I claim:

1. A teletypewriter receiver comprising, in combination, a radio frequency amplifier stage; a mixer stage having a first input circuit, a second input circuit, and an output circuit; a heterodyning oscillator stage; said radio frequency amplifier stage being connected to said first input circuit of said mixer stage, and said heterodyning oscillator stage being connected to said second input circuit of said mixer stage; amplifying means coupled to said output circuit of said mixer stage and effective over a wide range of frequencies; detecting means coupled to said amplifying means, and resonant circuit means coupled to said detecting means to resonate said detecting means over a band encompassing the output frequency range of said amplifying means; a frequency discriminator stage having an input circuit connected to said resonant circuit means and a plurality of output circuits; a plurality of amplitude responsive gate circuits responsive individually to the output levels of said discriminator stage produced by respective pulse-repetition rates at its input; and a plurality of counter chain circuits, each of said output circuits of said discriminator stage being coupled through a respective one of said gate circuits to a respective one of said counter chain circuits, whereby only that one of said counter chain circuits corresponding to an individual pulse-repetition rate is energized to count pulses occurring at said rate.

2. A teletype writer receiver in accordance with claim 1, in which said amplifying means comprises a plurality of intermediate frequency amplifiers having their outputs respectively connected to a plurality of detectors constituting said detecting means.

3. A teletypewriter receiver comprising, in combination, a radio frequency amplifier stage; a mixer stage having a first input circuit, a second input circuit, and an output circuit; a heterodyning oscillator stage; said radio frequency amplifier stage being connected to said first input circuit of said mixer stage, and said heterodyning oscillator stage being connected to said second input circuit of said mixer stage; amplifying means coupled to said output circuit of said mixer stage and effective over a wide range of frequencies; detecting means coupled to said amplifying means; a plurality of resonant circuits coupled to said detecting means to resonate said detecting means over a band encompassing the output frequency range of said amplifying means; and a plurality of counter chain circuits; the outputs of said resonant circuits being coupled to respective ones of said counter chain circuits, whereby only that one of said counter chain circuits corresponding to each individual pulse-repetition rate is energized to count pulses occurring at said rate.

4. A teletypewriter carrier signal wave receiver adapted to discriminate amongst, and to respond selectively to, sequential character signal pulse groups distinguishable from one another on the basis of the combination of a pulse-number characteristic and the repetition rate of a cyclic tone-shift modulation of the carrier, comprising, in combination:

means for receiving and detecting the carrier wave to recover therefrom the tone-shift modulation components thereof, a discriminator means coupled to the receiving and detecting means for developing a control signal output representative of the cyclic repetition rate of the tone-shift modulation of the received carrier, a plurality of channel gates connected to the output of said discriminator means for selectively passing only those control signal outputs associated with a particular cyclic repetition rate of the carrier modulation, a plurality of counter devices respectively coupled to the outputs of said channel gates, and means connected to the counter devices for manifesting each received pulse group as a particular character corresponding to the combination of pulse-number and cyclic repetition rate constituting such pulse group.

References Cited in the file of this patent

UNITED STATES PATENTS

| | | |
|---|---|---|
| 2,101,421 | Sprecker | Dec. 7, 1937 |
| 2,668,283 | Mullin | Feb. 2, 1954 |
| 2,716,158 | Shenk | Aug. 23, 1955 |
| 2,794,854 | Boughtwood | June 4, 1957 |

UNITED STATES PATENT OFFICE

CERTIFICATE OF CORRECTION

Patent No. 3,038,963 June 12, 1962

Oscar B. Dutton

It is hereby certified that error appears in the above numbered patent requiring correction and that the said Letters Patent should read as corrected below.

Column 1, line 67, for "FIGURE 2" read -- FIGURE 1 --; column 2, lines 65 and 66, for "intermeditae" read -- intermediate --; column 3, line 52, for "wall" read -- fall --; column 4, line 12, for "teletype writer" read -- teletypewriter --.

Signed and sealed this 30th day of October 1962.

(SEAL)
Attest:

ERNEST W. SWIDER
Attesting Officer

DAVID L. LADD
Commissioner of Patents